United States Patent
Hatayama

(10) Patent No.: US 6,829,407 B2
(45) Date of Patent: Dec. 7, 2004

(54) PLANAR OPTICAL CIRCUIT AND OPTICAL TRANSMISSION SYSTEM

(75) Inventor: Hitoshi Hatayama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 226 days.

(21) Appl. No.: 10/291,779

(22) Filed: Nov. 12, 2002

(65) Prior Publication Data

US 2003/0095738 A1 May 22, 2003

(30) Foreign Application Priority Data

Nov. 16, 2001 (JP) ............................. 2001-352090

(51) Int. Cl.$^7$ ............................. G02B 6/28; G02B 6/10; G02F 1/295; H04B 10/12
(52) U.S. Cl. ............................. 385/24; 358/5; 358/129; 359/341.1
(58) Field of Search ............................. 385/5, 14, 24, 385/129; 359/341.1, 341.2, 341.3

(56) References Cited

U.S. PATENT DOCUMENTS 6,020,991 A * 2/2000 Yoshinori et al. ........ 359/341.1
6,437,906 B1 * 8/2002 Di Pasquale et al. .... 359/337.2
2001/0050807 A1 * 12/2001 Deguchi et al. ........ 359/341.44

OTHER PUBLICATIONS

K. Inoue, et al., "Tunable Gain Equalization Using a Mach–Zehnder Optical Filter in Multistage Fiber Amplifiers", IEEE Photonics Technology Letters, vol. 3, No. 8, pp. 718–720 (1991).
G. H. B. Thompson, et al., "Planar Waveguide Filters for Dynamic Equalization of EDFA Spectra", ECOC '99, pp. 1–320–1–321 (1999).

* cited by examiner

Primary Examiner—John D. Lee
Assistant Examiner—Tina M Lin
(74) Attorney, Agent, or Firm—McDermott Will & Emery LLP

(57) ABSTRACT

Provided herein are a planar optical circuit and optical transmission system in which signal light power can be adjusted with respect to signal light and light that is different from the wavelength band of the signal light can be maintained satisfactorily. The planar optical circuit 1 is composed of a filter 10 that can cause loss of variable wavelength dependence to signal light of a signal light wavelength band such that signal light input from a signal light input end 111 is caused to have loss at given wavelength dependent loss by filter 10 and is output from signal light output end 112.

9 Claims, 6 Drawing Sheets

PLANAR OPTICAL CIRCUIT AND OPTICAL TRANSMISSION SYSTEM

BACKGROUND OF THE INVENTION

1. Field of the Invention

The present invention relates to a planar optical circuit that can be applied to a wavelength division multiplexing transmission system.

2. Description of the Background Art

An optical fiber amplifier amplifies signal light in an optical fiber. The optical fiber amplifier installed on an optical transmission line is equipped with an optical fiber for amplification, which also functions as the optical transmission line, and a pump light supplying means which supplies the optical fiber for amplification with the pump light. When signal light is input into the optical fiber for amplification to which pump light is supplied, the signal light is amplified and output. As for the optical fiber amplifier generally used heretofore, there are a rare-earth element doped fiber amplifier which uses stimulated emission phenomenon of a rare earth element, e.g. erbium, and a Raman amplifier which uses Raman amplification phenomenon by the stimulated Raman scattering.

In a Raman amplifier, an amplification wavelength band can be designed at any wavelength range by selecting a suitable wavelength for pumping light. Also, if pump light having a plurality of different wavelengths is supplied to the optical fiber for amplification, signal light can be amplified in the respective wavelength band adjusted to the amplification wavelength band determined by each pump light wavelength.

In recent years, the development and use are advanced with respect to the Wavelength Division Multiplexing (WDM) transmission system that can transmit signal light consisting of a plurality of signals having different wavelengths in an optical transmission line. When an optical amplifier is applied to such WDM transmission system, it is important to amplify the respective signals simultaneously with an equal gain to output them with constant power within a certain range. Therefore, in the WDM transmission system using an optical amplifier, an optical filter for canceling the wavelength dependence of intrinsic gain spectrum is used as a gain equalizer.

For example, techniques (gain equalization technology) for decreasing wavelength dependence in the gain of an optical amplifier by an optical filter using Mach-Zehnder interferometer are described in Literature 1 "K. Inoue, et al., "Tunable Gain Equalization Using a Mach-Zehnder Optical Filter in Multistage Fiber Amplifiers", IEEE Photonics Technology Letters, Vol. 3, No. 8, pp. 718–720 (1991)" and in Literature 2 "G. H. B. Thompson, et al., "Planar Waveguide Filters for Dynamic Equalization of EDFA Spectra", ECOC'99, pp 1-320–1-321(1999)."

These technologies are such that the wavelength dependence of loss in an optical filter is adjusted by adjusting the temperature of each arm of the Mach-Zehnder interferometer according to input signal power and thereby the wavelength dependence of intrinsic gain spectrum is canceled. Such a gain equalization technology is important for increasing transmission capacity of the WDM transmission system. As shown in FIG. 1 of Literature 1, an optical filter is placed outside the amps 1, 2, and 3 and hence pump light does not pass through the optical filter. Therefore, loss at a pump light wavelength is not considered in the optical filter.

SUMMARY OF THE INVENTION

An object of the present invention is to provide a planar optical circuit which can equally adjust the power of each signal of signal light that is wavelength-multiplexed and which can allow light of a second wavelength band different from the signal light wavelength band to pass at low loss, and to provide an optical transmission system using the planar optical circuit.

The planar optical circuit according to the invention has a substrate and an optical waveguide path formed on the substrate. This optical circuit comprises a signal light input end, signal light output end, and a filter disposed between the signal light input end and the signal light output end. The filter causes variably controllable wavelength dependent loss to signal light and is constituted such that light in a second wavelength band, which is different from a signal light wavelength band, is output at the other end with substantially constant loss.

This filter may be constituted by connecting in series a wavelength selecting circuit for defining a wavelength range in which wavelength dependent loss appears and an attenuation slope control circuit for defining the inclination of wavelength dependent loss relative to a wavelength.

In such a case, the wavelength selecting circuit may have a main waveguide path for connecting the signal light input end and signal light output end and a secondary waveguide path which is optically coupled with main waveguide path through at least two optical couplers and which constitutes a Mach-Zehnder interferometer in combination with the main waveguide path and the optical couplers. Also, the attenuation slope control circuit may have a main waveguide path, which connects the signal light input end and signal light output end, a secondary waveguide path which is optically coupled with the main waveguide path through at least two optical couplers and which constitutes a Mach-Zehnder interferometer in combination with the main waveguide path and the optical couplers, and a means for adjusting the temperature of the main waveguide path or secondary waveguide path. The filter may be composed of a plurality of wavelength selecting circuits and a plurality of attenuation slope control circuits, which are connected in series at a plurality of steps.

The signal light wavelength band may be designed to include a plurality of different wavelengths, and the second wavelength band may be arranged such that signal light in a signal light wavelength band can be Raman-amplified.

In addition, herein provided is an optical transmission system that is equipped with an optical transmission line for transmitting signal light and a planar optical circuit according to the present invention for causing wavelength dependent loss to signal light. The planar optical circuit is installed at a given position on the optical transmission line.

The present invention is further explained below by referring to the accompanying drawings. The drawings are provided solely for the purpose of illustration and are not intended to limit the scope of the invention.

DETAILED DESCRIPTION OF THE INVENTION

Figure 1:
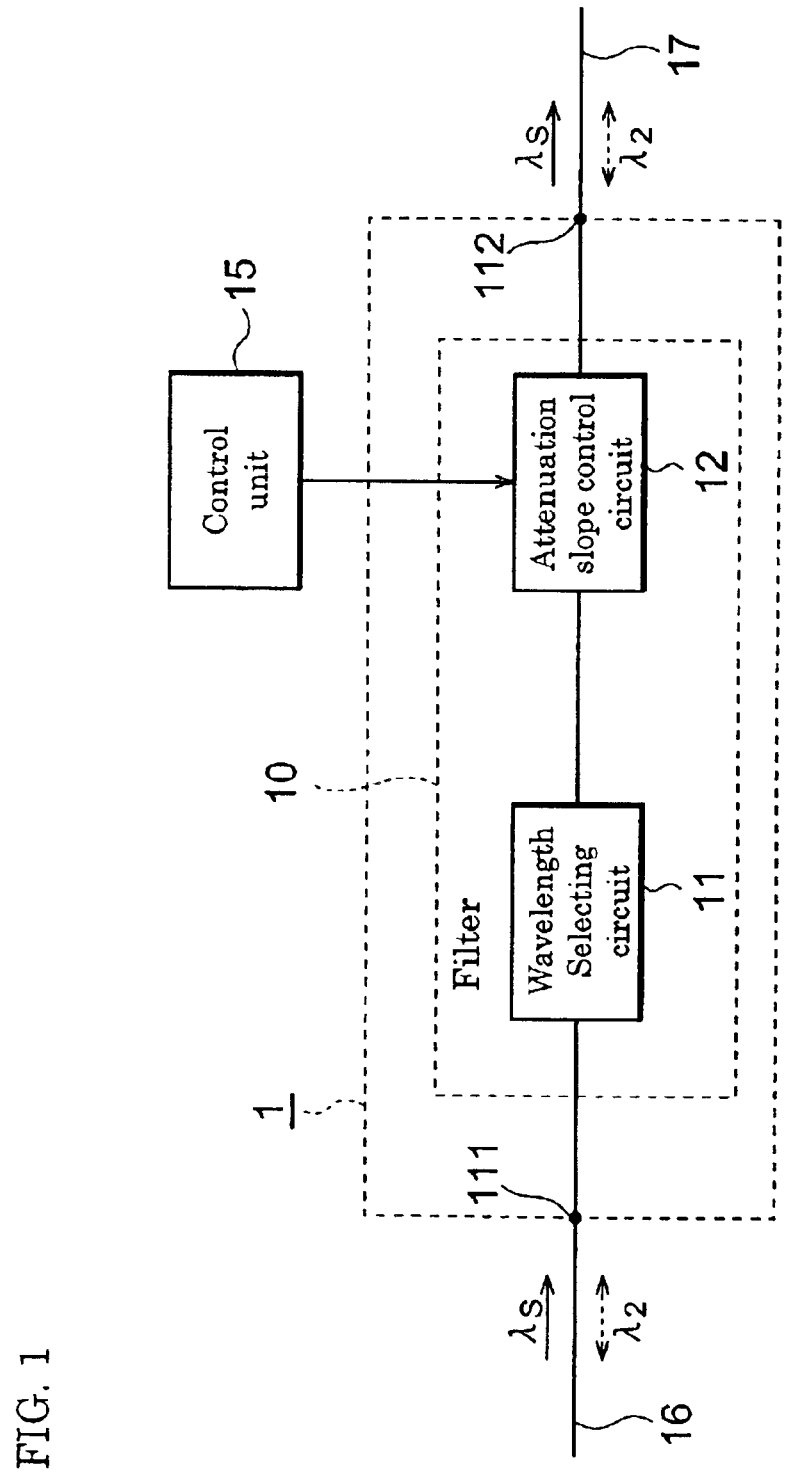
FIG. 1 schematically shows a first embodiment of the planar optical circuit according to the present invention.

Embodiments of the present invention are explained below by referring to the accompanying drawings. In the drawings, the same number refers to the same part to avoid duplicate explanation. The ratios of the dimensions in the drawings do not necessarily coincide with the explanation.

First, the basic composition of the planar optical circuit according to the present invention is explained. FIG. 1 schematically shows the first embodiment of the planar optical circuit. A planar optical circuit 1 according to the first embodiment comprises a substrate and an optical waveguide path formed with a given pattern on the substrate. A signal light input end 111, which is the input end for signal light of the optical circuit 1, is connected to an optical transmission line 16 for inputting signal light. Also, an output end 112, which is the output end for the signal light, is connected to an optical transmission line 17 for output the signal light.

A filter 10 is installed on an optical waveguide path between the input end 111 and output end 112. This filter 10 causes wavelength dependent loss to signal light (shown by the mark "λs" and a solid line arrow) that has been input from the optical waveguide path on the side of the input end 111, and outputs to the optical waveguide path on the side of the output end 112. The wavelength dependent loss to be caused by the filter 10 can be adjusted electrically, e.g. by a control signal from a control unit 15. The filter 10 causes a substantially constant loss to light (shown by the mark "λ2" and a dotted line arrow) which has been input from one of the input end 111 or the output end 112 and which is in a second wavelength band that is outside a signal light wavelength band, and outputs the light from the other end.

The filter 10 has two optical circuit parts: a wavelength selecting circuit 11 and an attenuation slope control circuit 12, which are coupled in series. The wavelength selecting circuit 11 is an optical circuit for defining a wavelength range in which wavelength dependent loss appears. Also, the attenuation slope control circuit 12 is an optical circuit for defining the inclination of wavelength dependent loss relative to the wavelength. In this composition, a control unit 15 controls wavelength dependent loss by controlling the attenuation slope control circuit 12.

By means of a planar optical circuit 1, the power of each signal light can be adjusted through variable wavelength dependent loss caused to signal light. Also, light in the second wavelength band can be allowed to pass the optical circuit 1 at desired loss, e.g. sufficiently low loss, regardless of the variation of the wavelength dependent loss. Therefore, the optical circuit 1 can be placed between an optical fiber for amplification and a device for multiplexing signal light and pump light, and hence the optical circuit and the multiplexing device can be formed on one chip, which increases the degree of design flexibility of a transmission line.

The loss value to light in the second wavelength band at filter 10 is set to a suitable value taking account of such a factor as power necessary for the light in the second wavelength band in the optical transmission system. For example, the loss may be designed such that a target value of loss to light in the second wavelength band is set and a substantially constant loss is obtained at the vicinity of the target value. Alternatively, a loss threshold value may be set to a loss value that is sufficiently low to be assumed as constant compared with loss to signal light and loss may be maintained to be substantially constant below the threshold value.

The signal light wavelength band of the optical circuit 1 can be used as a band which includes wavelength multiplexed signal light, and the second wavelength band can be used as a band which includes pump light that can Raman-amplify wavelength multiplexed signal light. Hereinafter, the application of the present invention to a WDM transmission system having such a Raman amplifier is explained. In the Raman amplifier, a silica-based optical fiber constituting an optical fiber transmission line can be used as the optical fiber for amplification. Therefore, in the WDM transmission system having a Raman amplifier, there is a case in which pump light and wavelength multiplexed signal light are combined to propagate through an optical transmission line.

If a conventional optical filter is applied to such a WDM transmission system in order to equalize amplification gain at an optical amplifier, the signal power of wavelength multiplexed signal light can be each controlled to become substantially equal, whereas an extra loss is caused to pump light. This is because a conventional optical filter is designed only taking account of optical characteristics of signal light which is subjected to gain equalization, and hence large loss is caused to light that is outside the wavelength band of signal light, and consequently optical characteristics is unstable. Therefore, pump light cannot be maintained in a suitable condition.

On the other hand, the planar optical circuit 1 functions as an optical filter for adjusting the power of each signal of wavelength multiplexed signal light, and allows pump light to pass at substantially constant loss. Therefore, extra loss is not caused to the pump light by the optical filter, and pump light for Raman amplification can be maintained in a desirable condition on the optical transmission line.

There is the relationship of λs–λp=Δλ between signal light wavelength λs and pump light wavelength λp through Raman shift quantity Δλ. In the case where the signal light wavelength is 1.55 mm, Raman shift quantity Δλ is about 100 nm. Also, the pump light wavelength band of pump light for Raman amplification to wavelength multiplexed signal light is set such that the wavelength band amplified by the pump light includes signal light wavelength band sufficiently. In the optical circuit 1, it is necessary to design optical penetration characteristics between the input end 111 and output end 112 taking account of such correlation between the signal light wavelength band and the pump light wavelength band.

More specifically, in a WDM transmission system using the 1.55 μm wavelength band as the wavelength band of wavelength multiplexed signal light, the signal light wavelength band preferably includes the wavelength band of wavelength 1.50 μm to 1.62 μm. In contrast to such signal light wavelength band, the pump light wavelength band, which is the second wavelength band, preferably includes the wavelength band of wavelength 1.40 μm to 1.42 μm. By designing such that the above-mentioned wavelength bands are respectively included in the signal light wavelength band, in which loss is variably caused, and the pump light wavelength band, in which light is allowed to pass at substantially constant loss, it is possible to achieve an optical circuit 1 in which the power of each signal of wavelength multiplexed signal light can be adjusted and pump light can be maintained in a desirable state.

Figure 2:
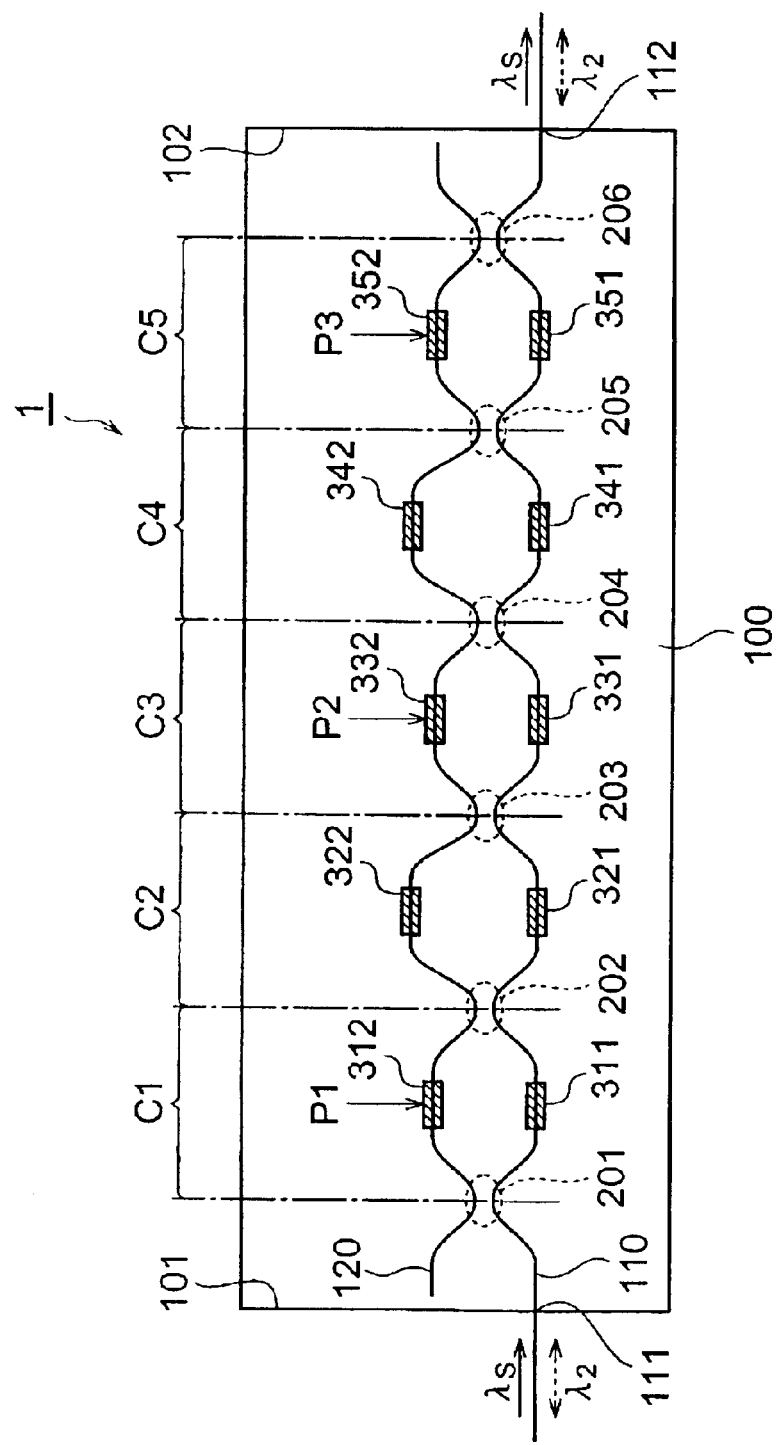
FIG. 2 schematically shows a second embodiment of the planar optical circuit according to the present invention.

FIG. 2 is a block diagram illustrating a second embodiment of the planar optical circuit. This embodiment exemplifies more concrete composition with respect to the planar optical circuit of the first embodiment.

The optical circuit 1 of the second embodiment is a planar optical circuit consisting of the optical waveguide paths formed on a substrate 100. On the substrate 100, a main waveguide path 110 and a secondary waveguide path 120 are provided between an end face 101, which is located on the input side relative to the direction of signal light transmission, and an end face 102, which is located on the output side opposite to the end face 101. Optical couplers 201, 202, 203, 204, 205 and 206 are provided in the enumerated order from the input end 111 to the output end 112 on the main waveguide path 110. The secondary waveguide path 120 is optically coupled to the main waveguide path 110 through each of the optical couplers 201–206. Five optical circuits C1–C5 which function respectively as a Mach-Zehnder interferometer are constituted of the main waveguide path 110, secondary waveguide path 120 and optical couplers 201–206, and they are connected at a plurality of steps in series in the enumerated order.

That is, the optical circuit C1, which is a first Mach-Zehnder interferometer, is composed of the optical coupler 201, optical coupler 202, and the main waveguide path 110 and secondary waveguide path 120 which are located between these optical couplers. The optical circuit C1 is provided with a heater 311 as a temperature adjusting means for adjusting the temperature of the main waveguide path 110. Also, a heater 312 is installed as a temperature adjusting means for adjusting the temperature of the secondary waveguide path 120. Similarly, on the optical circuits C2–C5, heaters 321, 331, 341 and 351 are installed respectively on the main waveguide path 110, and heaters 322, 332, 342 and 352 are installed respectively on the secondary waveguide path 120.

The optical circuit 1 consisting of the optical circuits C1–C5 which are connected in series at a plurality of steps is the part equivalent to the filter 10 of FIG. 1. In this optical circuit 1, by means of the optical circuits C1–C5, signal light having a wavelength λs of a signal light wavelength band, which has been input to the input end 111, is allowed to pass through the main waveguide path 110 and is output from the output end 112 after a given wavelength dependent loss is caused thereto. Also, light having a wavelength λ2 of a second wavelength band, which has been input from either the input end 111 or the output ends 112, passes through the main waveguide path 110 at substantially acceptable constant loss, and is output from the other end.

The heaters 311–352 installed respectively on the optical circuits C1–C5 adjust the phase variation amount of light allowed to propagate through the main waveguide path 110 and secondary waveguide path 120, respectively. Thus, it is possible to electrically adjust the wavelength dependent loss caused to light of a signal light wavelength band in the optical waveguide path extending from the input end 111 to the output end 112 through the Mach-Zehnder interferometers of the optical circuits C1–C5.

In the optical circuit 1 of the present embodiment, at the optical circuit C2, the electric power supplied to the heaters 321 and 322 is constant respectively. Therefore, at the optical circuit C2, the temperature and the phase variation amount of light between the optical coupler 202 and optical coupler 203 are adjusted to be constant in each of the main waveguide path 110 and secondary waveguide path 120. Similarly, at the optical circuit C4, electric power supplied to the heaters 341 and 342 is constant, respectively. Thus, the optical circuits C2 and C4 mainly function as a wavelength selecting circuit 11 in the filter 10 of FIG. 1, respectively.

Also, at optical circuits C1, C3 and C5, electric power supplied to the heaters 311, 331 and 351 each is constant, and the electric power P1, P2 and P3 supplied to the heaters 312, 332 and 352 are made variable, respectively. Therefore, for example, the temperature and the phase variation amount of light in the main waveguide path 110 between the optical coupler 201 and optical coupler 202 in the optical circuit C1 is adjusted to be constant, while the temperature and the phase variation amount of light in the secondary waveguide path 120 is adjusted variably. Thus, each of the optical circuits C1, C3, and C5 functions as an attenuation slope control circuit 12 in the filter 10.

By adjusting the combination of the optical circuits C1–C5 and the respective optical characteristics, a loss value and wavelength dependent loss to signal light of signal light wavelength band and light of the second wavelength band are set respectively in the whole of the optical circuit 1. Also, wavelength dependent loss to signal light is controlled variably.

In the planar optical circuit 1 shown in FIG. 2, the filter 10 of the optical circuit 1, more specifically the wavelength selecting circuit 11 and attenuation slope control circuit 12, is formed using Mach-Zehnder interferometers. Therefore, it is possible to downsize the planar optical circuit 1 by simplifying the composition of the optical circuit to the utmost. However, the filter 10 may use an optical circuit of other composition.

Also, the filter 10 is formed by connecting Mach-Zehnder interferometers (optical circuits C2 and C4), which function as the wavelength selecting circuit 11, and Mach-Zehnder interferometers (optical circuits C1, C3, C5), which function as the attenuation slope control circuit 12, at a plurality of steps in series. With such composition of an optical circuit, it is possible to improve the degree of freedom in setting the spectral shape of wavelength dependent loss in the filter 10 and the controllability of loss when variably adjusting wavelength dependent loss.

Figure 3:
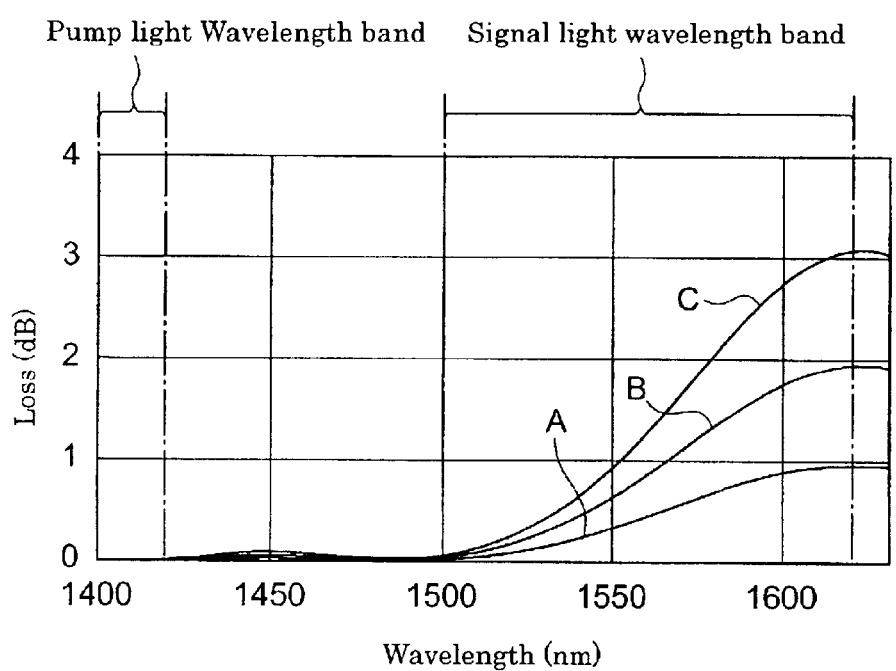
FIG. 3 is a graph showing an example of optical characteristics of the planar optical circuit shown in FIG. 2.

FIG. 3 is a graph showing an example of optical characteristics of the planar optical circuit shown in FIG. 2. In this graph, the abscissa represents a wavelength λ of light, and the ordinate represents loss caused to light passing through the optical circuit 1.

In the following, the signal light wavelength band is 1.50 μm–1.62 μm. Also, the pump light wavelength band (second wavelength band) for Raman-amplifying signal light of the signal light wavelength band is 1.40 μm–1.42 μm.

In FIG. 3, the curves A, B, and C show the light penetration characteristics in the case where the electric power P1, P2, and P3 to be supplied to each of the heaters 312, 332, and 352 shown in FIG. 2 is set as shown in Table I.

TABLE I

| Curve | A | B | C |
| --- | --- | --- | --- |
| P1 mW | 28 | 53 | 80 |
| P2 mW | 56 | 106 | 160 |
| P3 mW | 28 | 53 | 80 |

As shown in FIG. 3, the wavelength dependent loss to be caused to light of the signal light wavelength band of wavelength 1.50 μm–1.62 μm is electrically controlled by changing the supplied electric power P1, P2, and P3. On the other hand, light of the pump light wavelength band (second wavelength band) of wavelength 1.40 µm–1.42 µm is maintained at substantially constant loss of sufficiently low level regardless of the variation in electric power supplied to the heaters.

Figure 4:
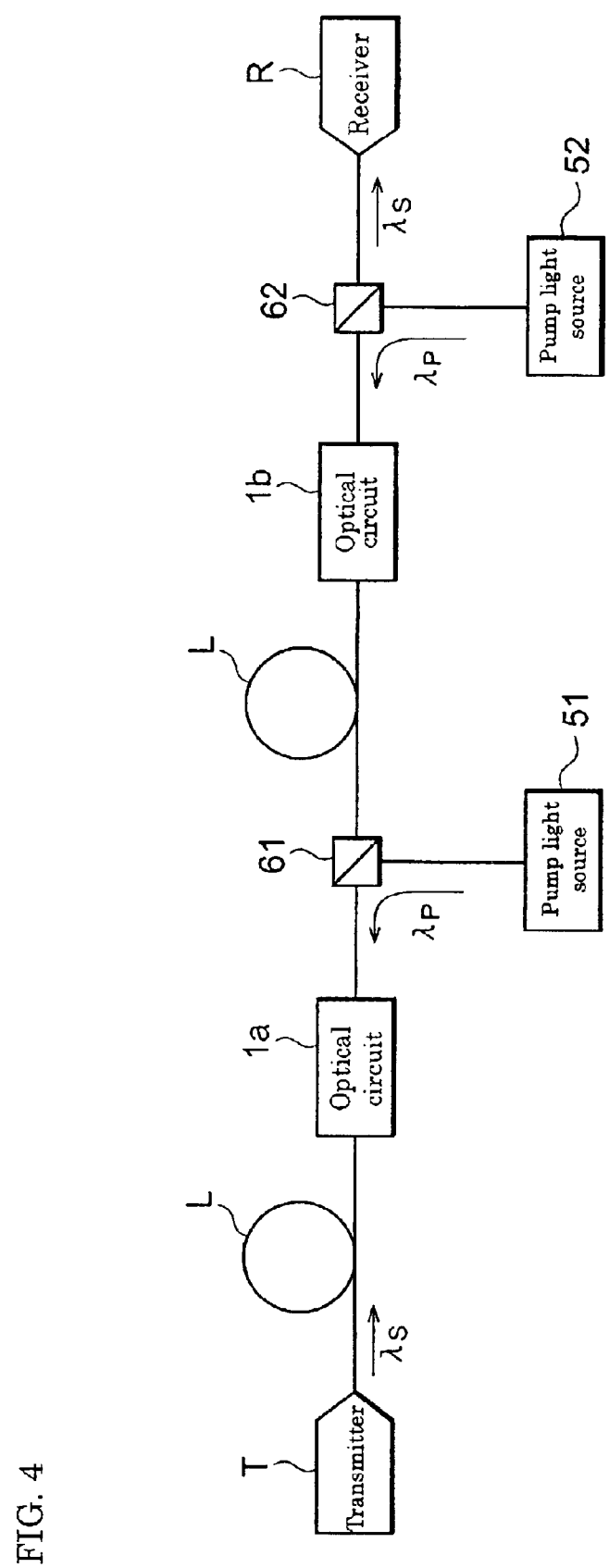
FIG. 4 schematically shows one embodiment of the optical transmission system that uses the planar optical circuit shown in FIG. 1 and FIG. 2.

Next, an optical transmission system of the present invention using the optical circuit of the above-described composition is explained. FIG. 4 is a block diagram showing one embodiment of the optical transmission system in which the planar optical circuits shown in FIG. 1 and FIG. 2 are applied. The optical transmission system comprises a transmitting station (transmitter) T, which transmits signal light having a wavelength λs in a given signal light wavelength band, an optical fiber transmission line L through which signal light from the transmitting station T propagates, and a receiving station (receiver) R, which receives the signal light transmitted through the optical fiber transmission line L. Also, two optical circuits 1a and 1b as the planar optical circuit having the composition shown in FIG. 1 and FIG. 2 are installed on optical fiber transmission line L.

The optical transmission system of the present embodiment is provided with two pump light sources, that is, a pump light source 51 on the upstream side and a pump light source 52 on the downstream side in the optical transmission line L consisting of a silica-based optical fiber. These pump light sources 51 and 52 are the pump light supplying means for supplying the pump light having a wavelength λp (=λ2) in a pump light wavelength band (second wavelength band) that can Raman-amplify transmitted signal light, to optical fiber transmission line L.

The pump light source 51 is connected to the optical fiber constituting the optical transmission line L by an optical multiplexer 61 provided on the optical transmission line L. The optical multiplexer 61 allows signal light which has reached it from the transmitting station T to pass to the receiving station R, and multiplexes the pump light supplied from the pump light source 51 in the opposite direction. Also, an optical circuit 1a that functions as the optical filter is provided on upstream side of the light optical multiplexer 61.

In such structure, the pump light output from the pump light source 51 through the light optical multiplexer 61 passes through the optical circuit 1a in the opposite direction with substantially constant loss and is supplied to the optical fiber that functions as the optical fiber for Raman amplification on the upstream side of the optical transmission line L. Thus, the optical fiber of the optical transmission line L and the pump light source 51 constitute a distributed parameter Raman amplifier. Also, the signal light which has been Raman-amplified by this Raman amplifier is adjusted in terms of the signal light power when it passes in the forward direction through the optical circuit 1a that can vary the wavelength dependent loss of the light in the signal light wavelength band.

Similarly, the optical fiber of optical transmission line L and the pump light source 52 comprise a distributed parameter Raman amplifier. Also, signal light which has been Raman-amplified by the Raman amplifier is adjusted in terms of signal light power when it passes in the forward direction through the optical circuit 1b which is located between an optical multiplexer 62 and optical transmission line L and which can vary wavelength dependent loss in the light of signal light wavelength band.

Thus, by applying the planar optical circuit 1 having the above-described composition as an optical filter for adjusting signal light power in a WDM transmission system, it is possible to achieve an optical transmission system in which the signal light power of signal light transmitted through the optical transmission system L can be adjusted suitably and pump light that does not need adjusting of optical power can be maintained in a desired condition. Therefore, it is possible to equalize the amplification gain of signal light while maintaining the efficiency of amplification by a Raman amplifier in a satisfactory level, for example. As for light of the second wavelength band in which loss is set to be substantially constant at the optical circuit 1, light other than pump light for Raman amplification may be assumed according to the composition of an optical transmission system to which the optical circuit is applied.

The optical characteristics and preferable composition of the planar optical circuit 1 having the composition shown in FIG. 2 will be further described with reference to FIG. 5. Here, the setting of a signal light wavelength band and a pump light wavelength band (second wavelength band) is the same as in the example of FIG. 3. As for the optical path lengths (arm lengths) of the main waveguide path 110 and secondary waveguide path 120, which constitute the optical circuit 1, the optical path length in the main waveguide path 110, and the secondary wavelength path 120 at an optical circuit Ci (i=1, 2, . . . , 5) are represented by Li1 and Li2, respectively, and the difference of optical path length ΔLi between the main waveguide path 110 and the secondary waveguide path 120 at the optical circuit Ci is represented by ΔLi=Li2·Li1.

First, an explanation of the optical circuits C1, C3, and C5 that function mainly as an attenuation slope control circuit 12 is given. The optical circuits C1, C3, and C5, which are Mach-Zehnder interferometers having the optical path length differences of ΔL1, ΔL3, and ΔL5, respectively between the main waveguide path 110 and the secondary waveguide path 120, define an inclination of wavelength dependent loss of signal light in the signal light wavelength band relative to a wavelength by adjusting the branching ratio of light of each wavelength. In order to achieve this feature suitably, it is desirable that the optical characteristics of an optical circuit have small wavelength dependence in the optical circuits C1, C3, and C5.

To attain the condition of such characteristics, preferably the optical path length differences ΔL1, ΔL3, ΔL5 in the optical circuits C1, C3, and C5 are designed to be as small as possible in the range where a branching ratio can be adjusted arbitrarily. More specifically, it is preferable to determine the optical path length difference ΔLi such that the following condition is satisfied:

$$-\lambda 0/2n_{e\!f\!f} \leq \Delta Li \leq \lambda 0/2n_{e\!f\!f}\ (i=1, 3, 5)$$

where, λ0 is the central wavelength of a WDM signal light wavelength band and $n_{e\!f\!f}$ is an effective refractive index of an optical waveguide path.

As a numerical value example, in the case where the central wavelength λ0=1.56 µm in the signal light wavelength band 1.50 µm–1.62 µm, the effective refractive index $n_{e\!f\!f}$ of the optical waveguide path=1.45, the above condition becomes −0.54 µm ≦ΔLi≦0.54 mm (i=1, 3, 5)

Next, the optical circuits C2, and C4 that mainly function as the wavelength selecting circuit 11 are described. The optical circuits C2 and C4 which are Mach-Zehnder interferometers having the optical path length differences ΔL2 and ΔL4 respectively. The optical circuits define a wavelength range where wavelength dependent loss appears with respect to light passing through the optical circuit 1. Here, when the pump light wavelength band that can Raman-amplify signal light in the signal light wavelength band is assumed as the second wavelength band, the spectral shape of loss must be designed to control loss to remain substantially constant in the pump light wavelength band and to have wavelength dependent loss in the signal light wavelength band. Therefore, the optical path length differences ΔL2 and ΔL4 must be set to have the same sign, and moreover the summation |ΔL2+ΔL4| of the optical path length difference must be in a predetermined range.

Figure 5:
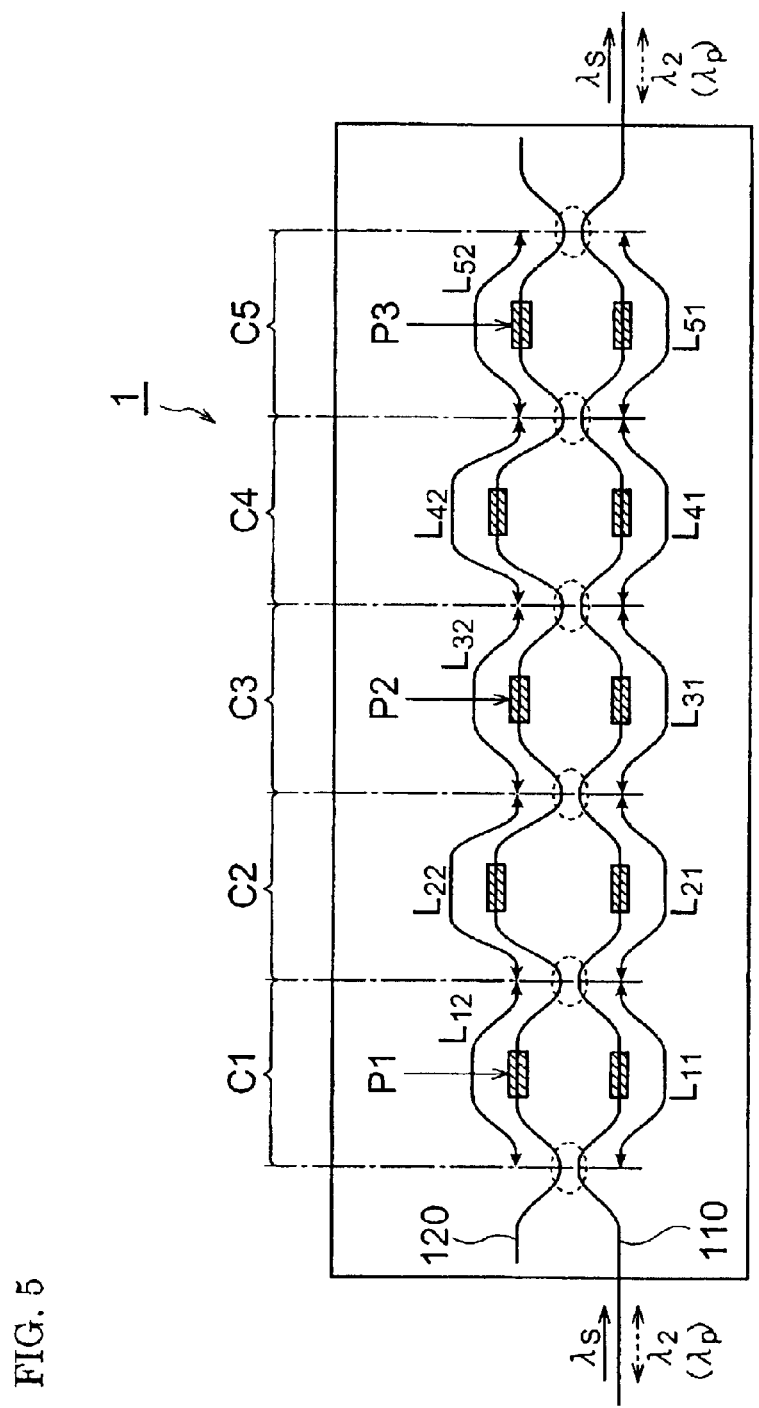
FIG. 5 is a schematic diagram illustrating the planar optical circuit shown in FIG. 2.
Figure 6:
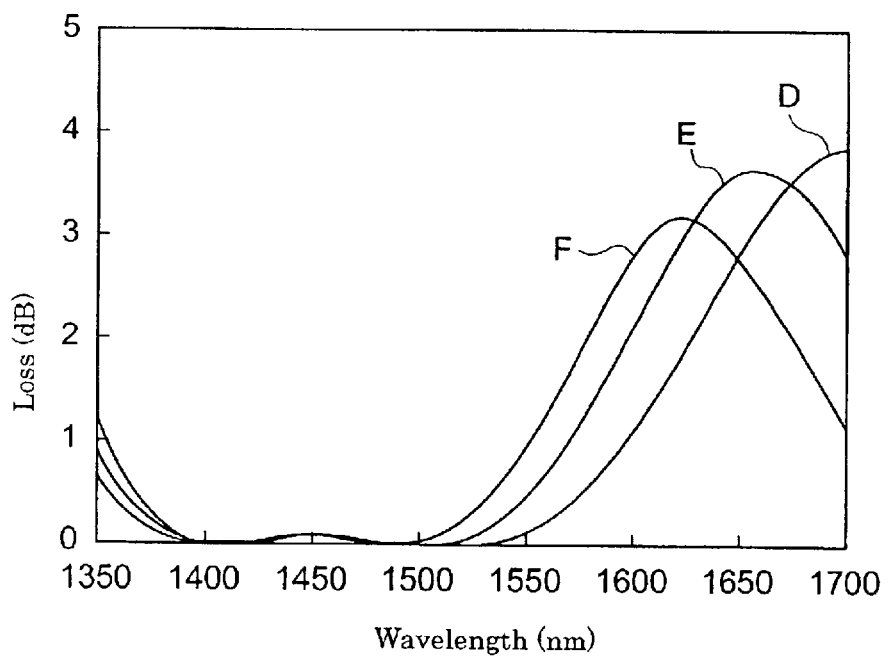
FIG. 6 is a graph showing an example of optical characteristics of the planar optical circuit shown in FIG. 2.

FIG. 6 is a graph showing an example of the optical characteristics of the planar optical circuit shown in FIG. 2 & FIG. 5. In this graph, the abscissa shows a wavelength ? and the ordinate represents loss caused to light passing through the optical circuit 1. The curves D, E, and F show the penetration characteristics of light when the summation |ΔL2+ΔL4| of differences of the optical path length is set to satisfy $7\lambda p/n_{eff}$, $8\lambda p/n_{eff}$, and $9\lambda p/n_{eff}$, respectively. Here, $\lambda p$ is the shortest wavelength of the pump light.

As shown in FIG. 6, as for the penetration characteristics of light from the input end 111 to the output end 112 in the optical circuit 1 having the composition shown in FIG. 2, as the value of |ΔL2+ΔL4| increases, the wavelength range in which the wavelength dependent loss can be compensated becomes narrow. Thus, in the case of $|ΔL2+ΔL4|>9\lambda p/n_{eff}$, it becomes difficult to compensate the wavelength dependent loss sufficiently over the whole of the WDM signal light wavelength band of wavelength 1.50 μm–1.62 μm.

On the other hand, when the value of |ΔL2+ΔL4| decreases, the wavelength range in which the wavelength dependent loss can be compensated shifts to the long wavelength side. Thus, in the case of $|ΔL2+ΔL4|<7\lambda p/n_{eff}$, it is impossible to compensate the wavelength dependent loss in a wavelength range on the short wavelength side of the WDM signal light wavelength band.

Therefore, it is preferable that the optical path length differences ?L2 and ?L4 in the optical circuits C2 and C4 satisfy the following condition.

$$7\lambda p/n_{eff} \leq |ΔL2+ΔL4| \leq 9\lambda p/n_{eff}$$

(where, ΔL2×ΔL4>0).

As a numerical example, in the case of the pump light wavelength band 1.40 μm–1.42 μm, the shortest wavelength λp of pump light=1.40 μm, the effective refractive index $n_{eff}$ of the optical waveguide path=1.45, the above condition is 6.8 μm≦|ΔL2+ΔL4|≦8.7 μm.

The planar optical circuit of the present invention is not limited to the above mentioned embodiments and examples, and various alterations thereto are possible. For example, although the filter 10 comprises the wavelength selecting circuit 11 and the attenuation slope control circuit 12 in the planar optical circuit 1 shown in FIG. 1, the filter 10 may be an optical circuit of other composition, provided that the wavelength dependent loss to signal light can be variably controlled and the optical characteristics achieved are such that the loss to light of the second wavelength band is maintained substantially constant. In the optical circuit composition consisting of the Mach-Zehnder interferometers at a plurality of steps as shown in FIG. 2, each Mach-Zehnder interferometer may have the functions of both setting loss and controlling loss.

The entire disclosure of Japanese Patent Application No. 2001-352090 filed on Nov. 11, 2001 including the specification, claims, drawings and summary are incorporated herein by reference in its entirety.

What is claimed is:

1. A planar optical circuit comprising:

a signal light input end for inputting signal light in a signal light wavelength band, a signal light output end for outputting the signal light, and a filter disposed between the signal light input end and the signal light output end, the filter being capable of causing variably controllable wavelength dependent loss to the signal light, wherein the filter is constituted such that light of a second wavelength band different from the signal light wavelength band that has been input from either the signal light input end or the signal light output end is output to the other end at substantially constant loss.

2. A planar optical circuit according to claim 1, wherein the filter is constituted by connecting in series a wavelength selecting circuit for defining a wavelength range in which wavelength dependent loss appears and an attenuation slope control circuit for setting an inclination of the wavelength dependent loss relative to a wavelength.

3. A planar optical circuit according to claim 2, wherein the wavelength selecting circuit comprises a main waveguide path and a secondary waveguide path, the main waveguide path connecting the signal light input end and the signal light output end; and the secondary waveguide path being combined with the main waveguide path through at least two optical couplers to constitute a Mach-Zehnder interferometer in combination with the main waveguide path and the optical couplers.

4. A planar optical circuit according to claim 2, wherein the attenuation slope control circuit comprises:

a main waveguide path connecting the signal light input end and the signal light output end;

a secondary waveguide path combined with the main waveguide path through at least two optical couplers to constitute a Mach-Zehnder interferometer in combination with the main waveguide path and the optical couplers; and a means of adjusting the temperature of the main waveguide path or the secondary waveguide path.

5. A planar optical circuit according to claim 2, wherein the filter is composed of a plurality of the wavelength selecting circuit and a plurality of the attenuation slope control circuit, which are connected in series at a plurality of steps.

6. A planar optical circuit according to claim 1, wherein the signal light wavelength band is set such that a plurality of signals having different wavelengths are included therein, and the second wavelength band is set such that signal light in the signal light wavelength band can be Raman-amplified.

7. A planar optical circuit according to claim 1, wherein the signal light wavelength band includes the wavelength band of 1.50 μm–1.62 μm, and the second wavelength band includes the wavelength band of 1.40 μm–1.42 μm.

8. A planar optical circuit equipped with a filter for causing variably controllable wavelength dependent loss to signal light, the filter being constituted by connecting in series a plurality of Mach-Zehnder interferometers for defining a wavelength range of 1.50 μm–1.62 μm in which wavelength dependent loss appears and a plurality of Mach-Zehnder interferometers having a temperature adjusting means for defining an inclination of the wavelength dependent loss relative to a wavelength, such that light in the wavelength band of 1.40 μm–1.42 μm which has been input from either signal light input end or signal light output end is output to the other end at substantially constant loss.

9. An optical transmission system comprising an optical transmission line and a planar optical circuit defined in claim 1, wherein signal light in a given signal light wavelength band is transmitted through the optical transmission line, and the planar optical circuit is disposed at a given position on the optical transmission line and causes loss having a given wavelength dependence to the signal light.

* * * * *